E. W. BULLOCK, S. H. EARL AND G. H. BRYAN.
GEAR CUTTING MACHINE.
APPLICATION FILED NOV. 30, 1917.

1,351,200.

Patented Aug. 31, 1920.
8 SHEETS—SHEET 1.

WITNESSES:
H. E. Stonebraker
George W. Powell

Inventors
Edward W. Bullock
Schuyler H. Earl
George H. Bryan
BY Church & Rich
their ATTORNEYS.

E. W. BULLOCK, S. H. EARL AND G. H. BRYAN.
GEAR CUTTING MACHINE.
APPLICATION FILED NOV. 30, 1917.

1,351,200.

Patented Aug. 31, 1920.
8 SHEETS—SHEET 6.

Fig. 6

Inventors
Edward W. Bullock
Schuyler H. Earl
George H. Bryan
BY Church
their ATTORNEYS.

WITNESSES:
H. E. Stonebraker
George D. Powell

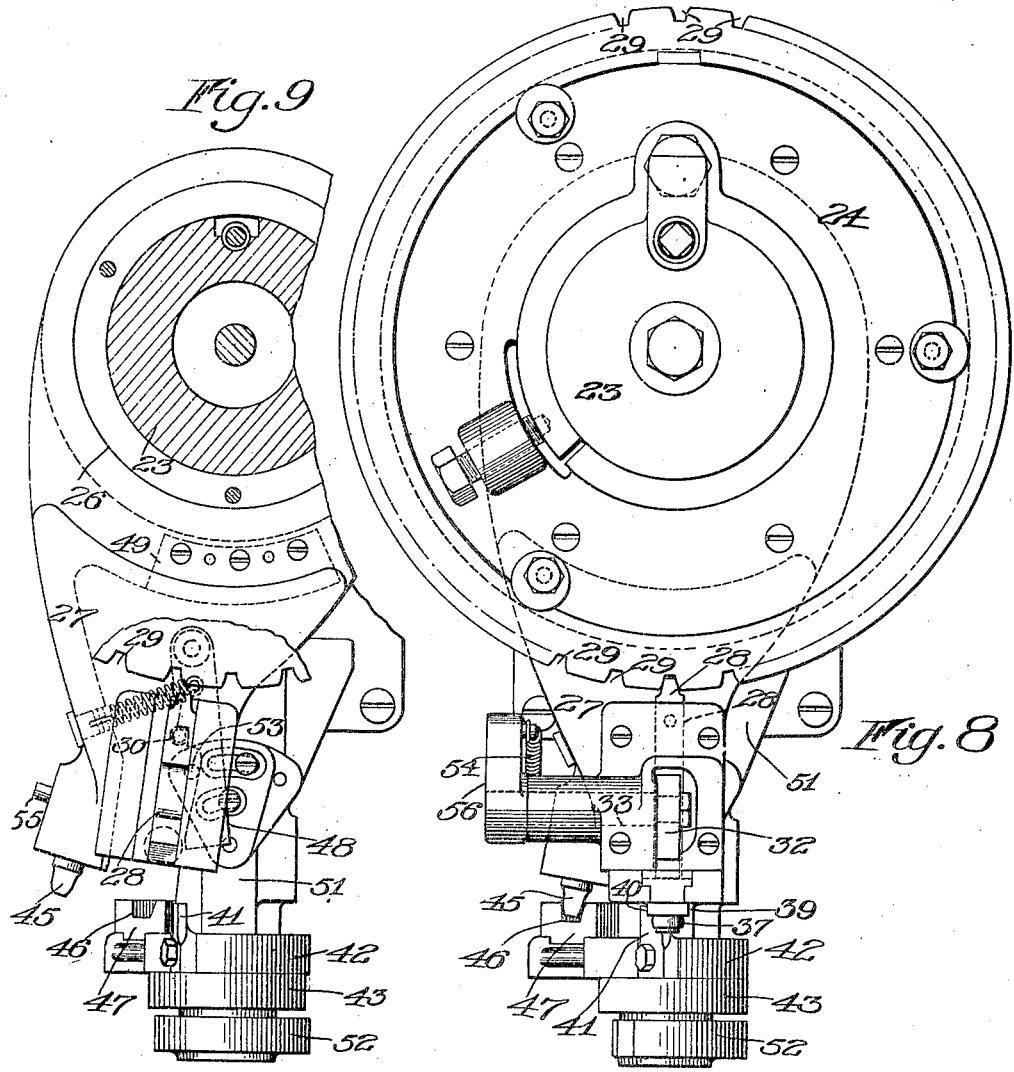

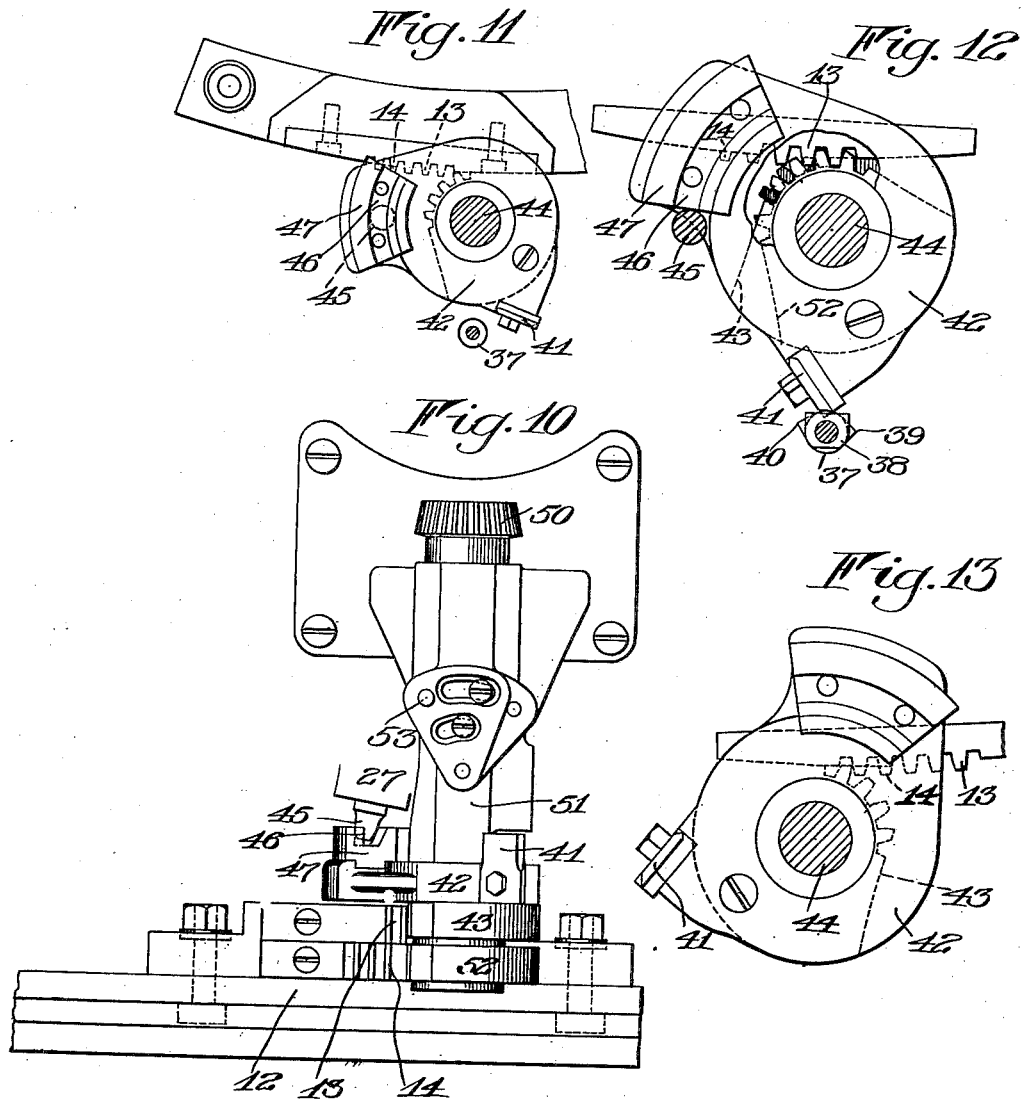

UNITED STATES PATENT OFFICE.

EDWARD W. BULLOCK, SCHUYLER H. EARL, AND GEORGE H. BRYAN, OF ROCHESTER, NEW YORK, ASSIGNORS TO GLEASON WORKS, OF ROCHESTER, NEW YORK, A CORPORATION OF NEW YORK.

GEAR-CUTTING MACHINE.

1,351,200. Specification of Letters Patent. Patented Aug. 31, 1920.

Application filed November 30, 1917. Serial No. 204,686.

*To all whom it may concern:*

Be it known that we, EDWARD W. BULLOCK, SCHUYLER H. EARL, and GEORGE H. BRYAN, all of Rochester, in the county of Monroe and State of New York, have invented certain new and useful Improvements in Gear-Cutting Machines; and we do hereby declare the following to be a full, clear, and exact description of the same, reference being had to the accompanying drawings, forming a part of this specification, and to the reference-numerals marked thereon.

The invention has to do with gear cutting machinery and one of its prime objects relates to the general type of apparatus in which the gear blank is indexed between successive cutting operations, that is, after the completion of each tooth surface or profile, whereupon the blank is indexed to bring another portion of the blank into position for a cutting operation, and the invention is intended to provide a simple and efficient mechanism for automatically indexing the blank at predetermined intervals. A further purpose of this portion of the invention is to provide an arrangement that is rigid and durable, requiring little attention aside from the usual operating control. Another purpose of the improvement is to increase the speed of the indexing operation, thus reducing the time during which cutting does not take place, and effecting a corresponding increase in the output of the machine. Still a further object of the invention lies in the provision of means for adequately bracing and strengthening the frame of the apparatus so as to bring about a more rigid relation between the gear blank and cutter supports, thus increasing the speed of production and obviating in large measure any irregularities or imperfect surfaces on the finished blank. To these and other ends the invention consists in certain improvements and combinations of parts, all as will be hereinafter more fully described, the novel features being pointed out in the claims at the end of the specification.

In the drawings:

Fig. 6 is a vertical sectional view through the blank spindle and the index mechanism;

Fig. 7 is a view in side elevation of the index mechanism shown in Fig. 6;

Fig. 8 is an end view of the index mechanism in normal position, with the index frame locked to the index wheel;

Fig. 9 is a vertical sectional view on the line 9ª—9ª of Fig. 6, illustrating the parts in the position they assume during the indexing operation;

Fig. 10 is an end elevation of a portion of the index mechanism, showing the relation of the actuating racks;

Fig. 11 is an enlarged horizontal sectional view of part of the indexing mechanism, showing the normal position of the actuating racks and coöperating gear members which they control;

Fig. 12 is a similar view showing the relation of parts after the initial movement of the actuating racks, which effects unlocking of the index frame;

Fig. 13 is a similar view showing the final position of the operating racks and the gear members which they control, just previous to the return movement to normal position;

Fig. 14 is a detail horizontal sectional view, showing in normal and subsequent relative positions the cam and coöperating projection which control unlocking of the index wheel, and also the position of the cam relatively to the projection during its return movement;

Fig. 15 is a similar view showing a possible position of these parts during the advance movement of the cam, and Fig. 16 is a similar view showing a possible position during the return movement of the cam to its normal position.

Similar reference characters in the several figures indicate the same parts.

Figure 1:
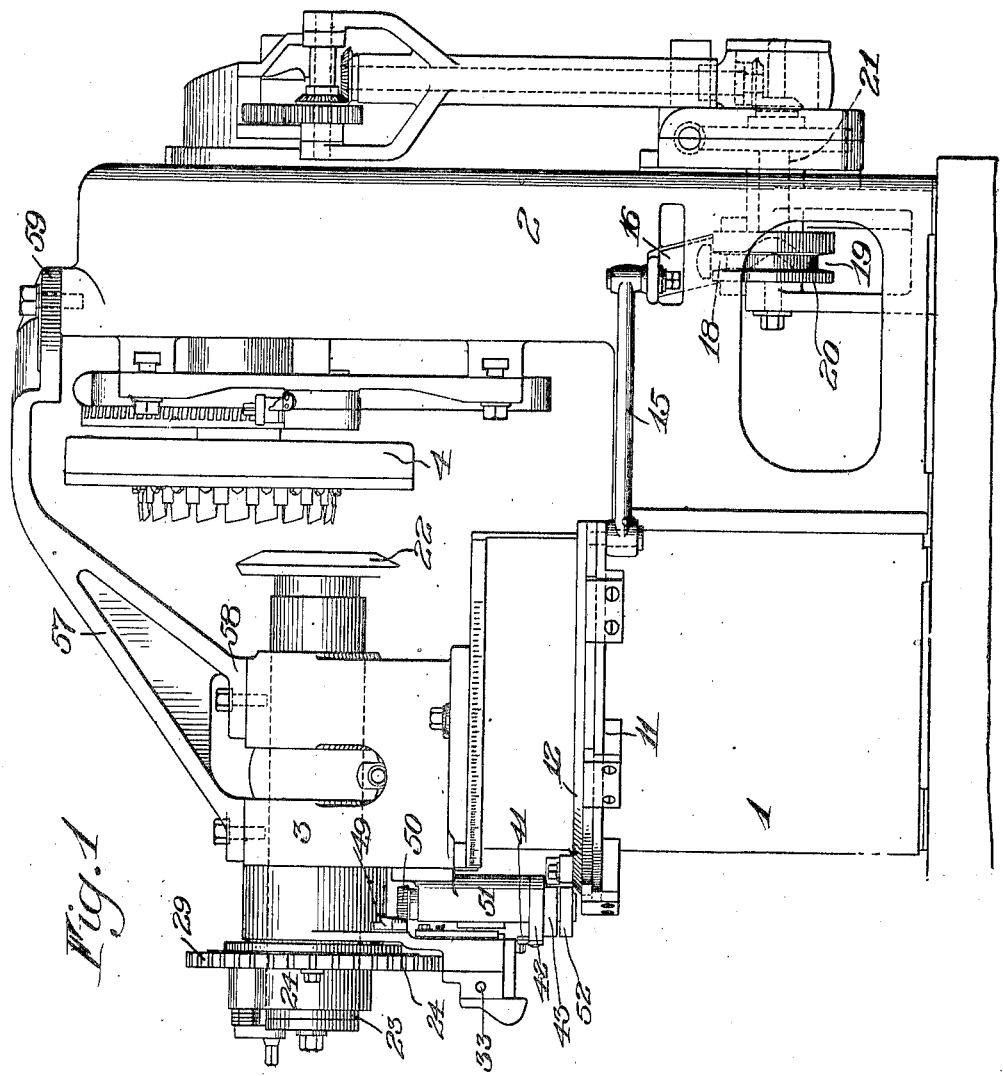
Figure 1 is a side elevation of an apparatus constructed in accordance with a practicable embodiment of the invention, and showing the cutter and blank supports adjusted out of cutting relation.

The invention is susceptible of a number of different applications, and in the present embodiment, which is intended merely by way of illustrative example, we have disclosed it as applied to a type of machine generally similar to that illustrated in the pending application of Edward W. Bullock and George H. Bryan, Serial No. 173,313, filed June 7, 1917, in which the cutter is retracted from the blank after each tooth space is completed, to permit indexing. In the present embodiment, the primary intention is to effect a roughing operation, and no specific mechanism is shown for imparting a generating or rolling motion to the gear blank during the cutting operation to impart any particular profile or cross-section, although it is within the purview of the invention to thus apply the principles of our improvement.

The structure shown comprises a base 1, a standard 2 comprising the support for the cutter mechanism, and a standard 3 or support in which the work spindle is mounted. The cutter head is designated by 4, and is mounted on a spindle 5 housed within a sleeve 6. The latter is reciprocated at predetermined intervals to withdraw the cutter from the blank, in accordance with the mechanism shown in the pending application above referred to, and for the purpose of the present disclosure it is unnecessary to describe more fully these parts. The cutter head carries an internal gear 7 which is driven by a pinion 8 on the driving shaft 9 while the latter carries a pulley 10 through which power is imparted to the machine.

The base of the machine is provided with a curved guide or track 11, within which moves a slide 12 carrying the actuating means in the form of racks 13 and 14 which will be more fully described hereinafter and the slide 12 is oscillated intermittently by a connecting rod 15 one end of which is pivoted to said slide, while the opposite end is connected to a lever 16 which is pivoted at 17 upon a stationary bearing and carries a projection or roller 18, engaging a cam slot 19 in the cam wheel 20. The latter is fixed upon the shaft 21 and is driven continuously from the main driving mechanism, the cam slot 19 being so formed as to effect the necessary oscillation of the slide 12 at predetermined intervals, and index the blank through the operation of parts which will presently be described.

The blank 22 is fixed upon the spindle 23, and the latter carries an index wheel 24 which is fixed thereto in the usual manner, or by any convenient means that permits of adjusting the index wheel with reference to the blank spindle and holding the parts fixedly in such adjusted relationship. The blank spindle 23 is journaled in a bearing 25 of the support, arranged upon the base 1 and preferably adjustable thereon to provide for different pitch angles in the cases of bevel gears and pinions. The bearing 25 includes an exterior surface or bearing 26 upon which is arranged a swinging index frame 27, and the frame 27 carries a slidable locking bolt 28 which engages notches 29 in the index wheel 24, thus locking the index frame and the index wheel together. The bolt 28 carries a pin 30 shown in Fig. 6, while 31 is a spring engaging said pin and acting to move the bolt to locking position in engagement with the index wheel. At predetermined intervals the bolt 28 is disengaged from the index wheel and the swinging frame is moved to bring the bolt into engagement with the next notch 29 of the index wheel, whereupon the bolt is released and again locks the index wheel with the swinging frame, which latter returns to its normal position and indexes the blank for another cutting operation. The mechanism whereby the bolt 28 is withdrawn and the swinging index frame is moved will now be described.

32 is an actuator or pawl pivoted upon the swinging frame at 33 and having a nose or projection 34 which projects into a recess 35 on the bolt 28 and engages a shoulder therein, so that when the actuator 32 is turned on its axis, the locking bolt 28 is withdrawn. The actuator 32 carries teeth $35^a$, which are engaged by a reciprocatory rack bar 36. The rack bar 36 reciprocates in the direction of its longitudinal axis as shown in Fig. 6, and carries a roller or projection 37 which extends downwardly and lies in the path of a controlling cam which, through the roller, effects movement of the rack bar 36. Arranged between the roller 37 and the rack bar is a collar 38 having extensions with edges 39 and 40 for a purpose that will appear presently.

The roller 37 is engaged and actuated by a cam 41, see Figs. 6 and 14 to 16, which is secured to a carrier 42. The latter is fixedly mounted upon a gear member 43, journaled on the spindle 44 and having teeth which are engaged by the aforementioned rack 13. As the rack 13 is oscillated, it turns the carrier 42, moving the cam 41 from the normal position shown in Fig. 14, past the roller 37. the inclination of the cam forcing the roller and the rack bar laterally, and moving the actuator 32 to withdraw the bolt 28 from the index wheel. At the same time that the swinging frame is unlocked from the index wheel, as just described, it is also released with reference to stationary locking means which normally prevents the swinging index frame from moving. This locking means comprises a bolt or projection 45 on the frame which engages a pocket or recess 46 in a block 47, also attached to the carrier 42 and as the latter is rotated from the normal position shown in Fig. 10, the bolt 45 is disengaged from the locking recess 46 as illustrated in Figs. 12 and 13. With the parts in this position the index frame is free to move with reference to the index wheel, during which movement the bolt 28, see Fig. 6, is held retracted by a spring controlled pivoted latch 48 which engages the pin 30 carried by the bolt 28, see Figs. 6 and 9. The bolt is held in this retracted position with the index wheel unlocked, during the time that the index frame is turning, which latter operation will now be described.

To this end, the index frame is provided with a gear segment 49, see Fig. 6, which meshes with a bevel pinion 50 fixed upon the driving spindle 44. The latter is journaled in a stationary bearing 51 and carries at its lower end a gear member 52 keyed thereon and having teeth which engage the aforementioned rack 14. The racks 13 and 14 are arranged upon the slide in such manner that the upper rack 13 engages the gear member 43 first, thereby causing the bolt 28 to be retracted, and also operating the block 47 to disengage it from the bolt 45. This operation takes place in a fraction of a second, and immediately thereafter the lower rack 14 engages its gear member 52, turning the driving spindle 44 and through pinion 50 and gear segment 49, effecting a corresponding turning movement of the index frame. The latter is thus operated for a predetermined distance, dependent upon the number of teeth in gear member 52, and at the end of this movement the latch 48, see Fig. 6, engages a stationary pin 53, rocking the latch on its pivot and disengaging it from the pin 30 so that the bolt 28 is free to return to its locking position, in engagement with the next adjacent notch of the index wheel. After the bolt 28 re-assumes such locking position, the return movement of the racks 13 and 14 takes place, causing the swinging frame to move back to its normal position, carrying with it the index wheel and thus indexing the blank spindle and blank for another cutting operation. The carrier 42 is also returned to its normal position, bringing the block 47 into locking relation with the bolt 45, whereby the index frame is held against movement during the cutting operation. As the carrier 42 returns to its initial position the cam 41 engages the opposite side of the roller 37, as indicated by dotted lines in Fig. 14, so as to permit the cam to regain its initial position without moving the bolt 28. During this return movement the rack bar 36 is moved rearwardly, until the cam 41 has moved past the roller 37, and the rack bar is then returned to its initial position by a spring 54, which is connected at one end to a pin 55 on the swinging index frame and at its other end to an arm 56 keyed upon the shaft 33, which carries the actuator 32, see Figs. 6 and 7. If the spring 54 should fail to act for any reason, the sharp edges of the cam 41 and the sharp edges 39 or 40 of the collar 38 would cause the cam to travel to one side of the roller or the other, the edges 39 and 40 acting as a guide for the cam and preventing any locking of these parts and consequent breaking of the machinery, as appears in Figs. 14 and 16.

In order to obtain uniform cutting and increase the speed of production, we provide means for securing a rigid relation between the cutter support and the blank spindle support. This means consists of a bracing member connecting the two supports and extending around the blank and cutter and preferably overhead, with reference thereto. This device is shown in the form of a brace having its lower end 58 bolted to the blank spindle support 3, its upper end 59 bolted to the top of the standard 2 in which the cutter is mounted, and its central portion 57 extending above the space occupied by the cutter and blank. To provide for different pitch angles of bevel gears, the blank spindle support 3 is adjustable upon the base as usual in this class of machinery, the normal cutting position being shown in Fig. 2. To permit this adjustment, the upper end 59 of the brace 57 is slotted at 60 to adjust it with reference to the standard 2. After the position of the cutter support is once determined and adjusted for any given blank, the brace is fixedly bolted in place, and thereafter serves to retain the cutter support and the blank spindle support firmly upon the base. This connecting brace is of considerable advantage in holding the blank and cutter in their proper relationship, which prevents any slight chatter and results in a smooth uniformly finished surface and a greatly increased cutting speed.

Figure 2:
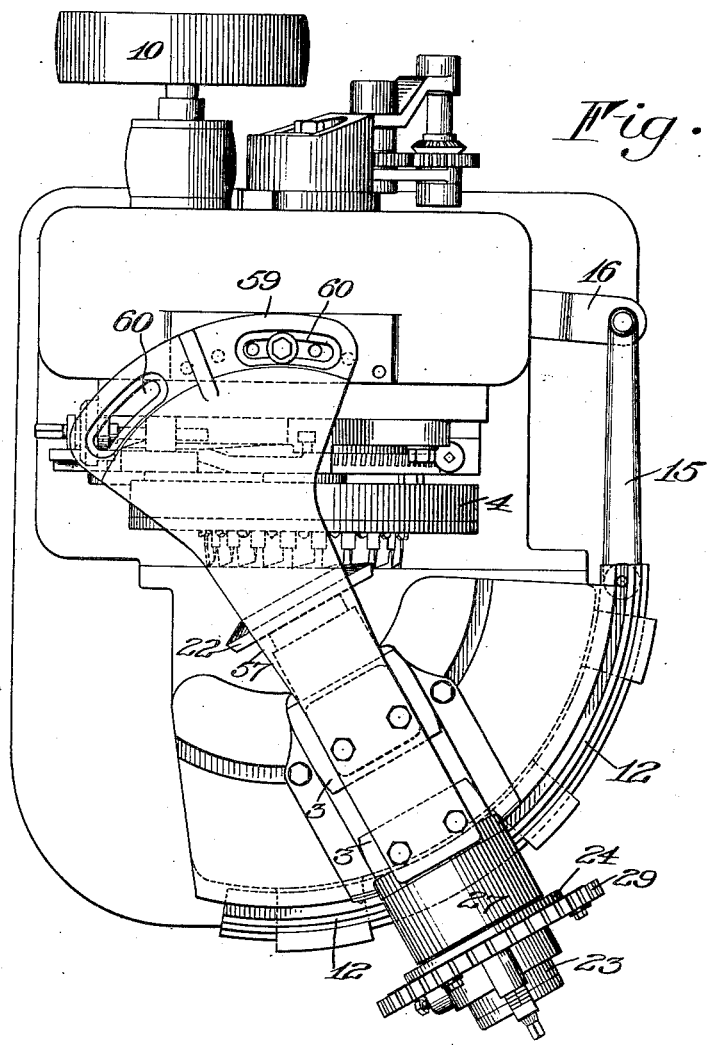
Fig. 2 is a plan view of the parts in normal cutting relation for producing a bevel gear.
Figure 3:
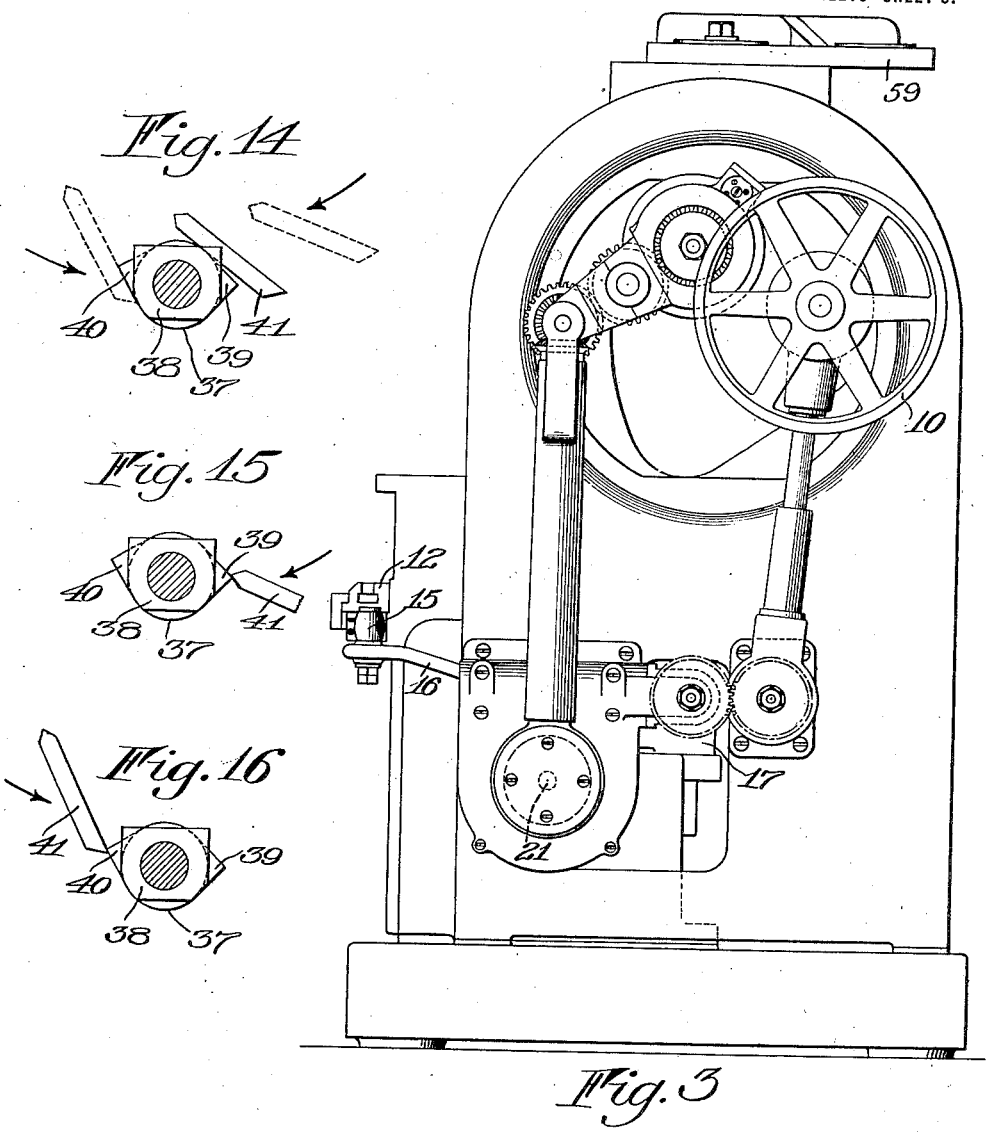
Fig. 3 is an end elevation.
Figure 4:
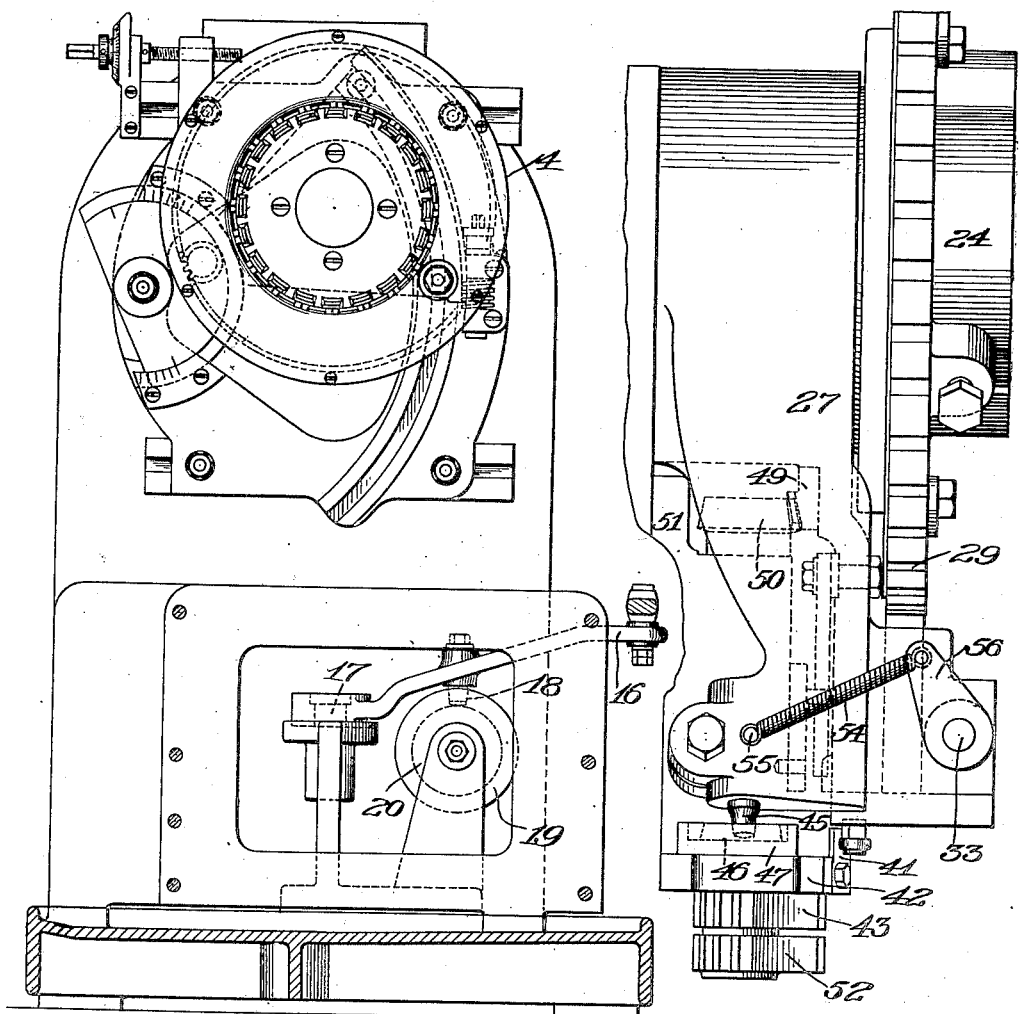
Fig. 4 is a transverse vertical sectional view taken in the cutting plane of the machine, part of the operating mechanism for the gear blank and also showing the cutter with its controlling mechanism.
Figure 5:
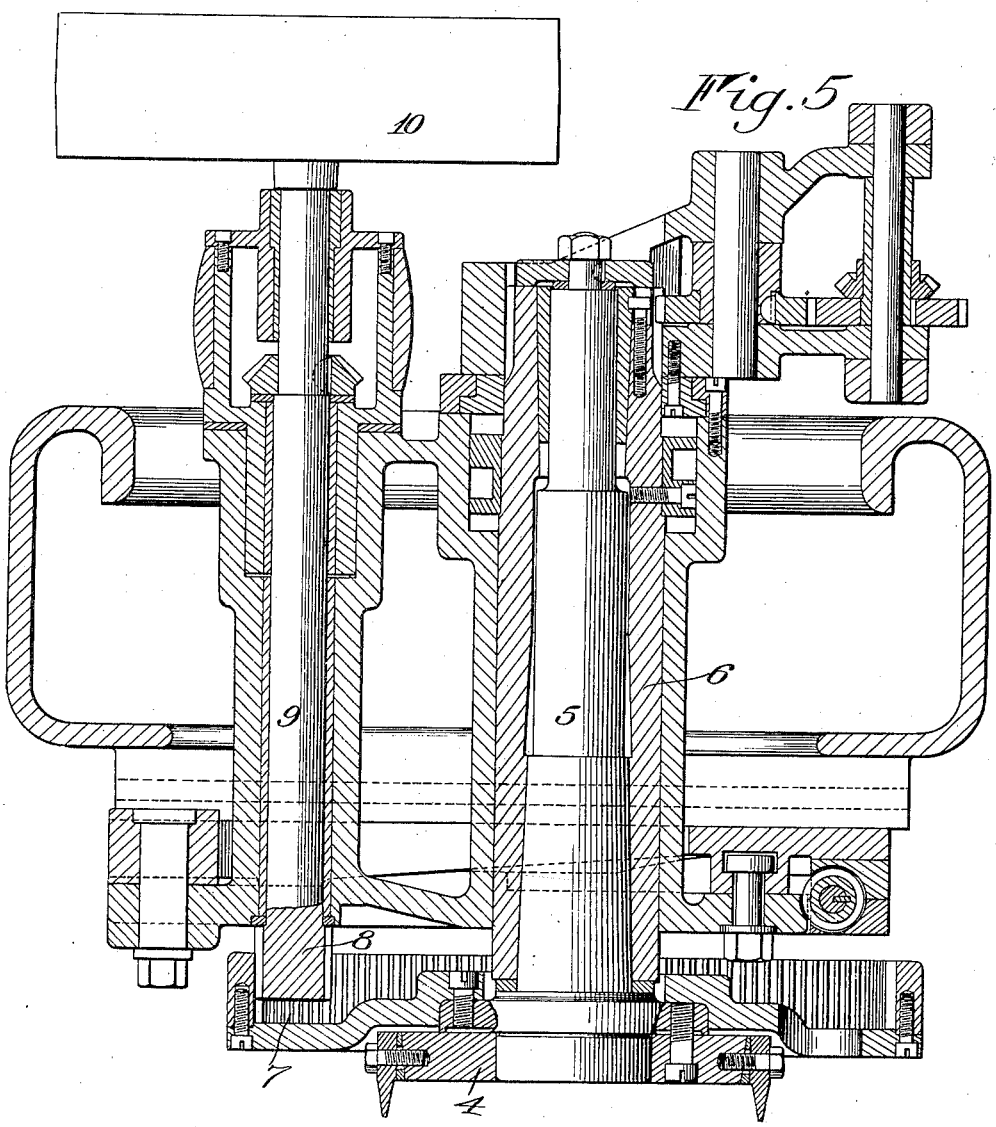
Fig. 5 is a horizontal sectional view taken centrally of the cutter and its controlling mechanism, also showing a portion of the mechanism for operating the gear blank.

The operation of the mechanism briefly is as follows: Assuming that the parts are adjusted as shown in Fig. 2 with the cutter in operative relation with the blank, the latter remains stationary while the cutter rotates for a predetermined period to complete a tooth face. Thereupon the cutter is withdrawn from the blank, at which time the cam wheel 20 reaches such a position as to rock the lever 16. This produces an oscillatory movement of the slide 12, and the actuating racks 13 and 14 which are adjustably mounted thereon. The racks 13 and 14 travel initially toward the right of Fig. 10, bringing the rack 13 into engagement first with the gear member 43. This action turns the carrier 42 and through the cam 41, roller 37, rack bar 36 and actuator 32, withdraws the bolt 28 from the index wheel. At the same time, the turning of the carrier withdraws the block 47 from the bolt 45, leaving the index frame free to move. Instantaneously thereafter, the rack 14 engages the gear member 52, whereby the driving spindle 44 is turned, and through pinion 50 operates the index frame through a predetermined distance. At the end of the movement of the index frame, the bolt 28 is automatically released and engages the next notch of the index wheel, thus again locking the index frame to the index wheel, and as the index frame returns to its normal position upon the return movement of the rack 14, the index wheel is carried with it and the blank thus turns through a distance of one tooth, or any other predetermined space.

We claim as our invention:

1. In a gear cutting machine, the combination with a blank spindle and an index wheel in fixed relation therewith, of a swinging index frame which is locked to the index wheel during the cutting operation, and actuating means which is normally stationary and is intermittently moved to unlock the index frame from the index wheel and turn it a predetermined distance after which it is again locked to the index wheel and returned to initial position, causing the index wheel to move a corresponding distance.

2. In a gear cutting machine, the combination with a blank spindle and an index wheel in fixed relation therewith, of a swinging index frame which is locked to the index wheel during the cutting operation, and actuating means which is stationary during the cutting operation and is oscillated to unlock the index frame from the index wheel and turn it a predetermined distance after which it is again locked to the index wheel and returned to initial position, causing the index wheel to move a corresponding distance.

3. In a gear cutting machine, the combination with a blank spindle and an index wheel in fixed relation therewith, of a swinging index frame which is locked to the index wheel during the cutting operation, a gear segment carried by said index frame, a driving spindle having a bevel pinion fixed thereon which engages said gear segment, a gear member also fixed on said spindle, an oscillatory rack which engages said gear member and turns it intermittently, and automatic means acting to unlock the swinging frame from the index wheel previously to the operation of said gear member.

4. In a gear cutting machine, the combination with a blank spindle and an index wheel in fixed relation therewith, of a swinging index frame which is locked to the index wheel during the cutting operation, actuating means which is stationary during the cutting operation and oscillated to unlock the index frame from the index wheel and turn it a predetermined distance after which it is again locked to the index wheel and returned to initial position, causing the index wheel to move a corresponding distance, locking means engaging the swinging frame, and automatic devices acting to release said locking means intermittently.

5. In a gear cutting machine, the combination with a blank spindle and an index wheel in fixed relation therewith, of a swinging index frame which is locked to the index wheel during the cutting operation, a gear segment carried by said index frame, a driving spindle having a bevel pinion fixed thereon which engages said gear segment, a gear member also fixed on said spindle, an oscillatory rack which engages said gear member and oscillates it intermittently, automatic means acting to unlock the swinging frame from the index wheel intermittently, a lock engaging the swinging frame, and automatic means acting to release said lock intermittently.

6. In a gear cutting machine, the combination with a blank spindle and an index wheel in fixed relation therewith, of a swinging index frame which is locked to the index wheel during the cutting operation, a gear segment carried by said index frame, a driving spindle having a bevel pinion fixed thereon which engages said gear segment, a gear member fixed on said spindle, an oscillatory rack which engages said gear member and oscillates it intermittently, automatic means acting to unlock the swinging frame from the index wheel intermittently, a second gear member controlling said unlocking means, and a second rack which is intermittently oscillated and engages the latter gear member.

7. In a gear cutting machine, the combination with a blank spindle and an index wheel in fixed relation therewith, of a swinging index frame which is locked to the index wheel during the cutting operation, a gear member controlling said frame, an actuating rack which is stationary during the cutting operation and oscillated to engage said gear member and turn the index frame a predetermined distance after which it is returned to initial position, causing the index wheel to move a corresponding distance, locking means engaging the swinging frame, automatic devices acting to release said locking means intermittently, a second gear member controlling the unlocking of the swinging frame and of the index wheel, and a second rack which is intermittently oscillated and engages the second gear member in advance of the engagement of the first named rack with the first gear member.

8. In a gear cutting machine, the combination with a blank spindle and an index wheel in fixed relation therewith, of a swinging index frame, a reciprocatory spring actuated bolt mounted on the frame for engagement with said index wheel, a pivoted actuator engaging said bolt and carrying a series of teeth, a rack bar coöperating with said teeth, a projection carried by the rack bar, a cam which intermittently engages said projection and moves the rack bar, and means acting to move the swinging frame after it is unlocked from the index wheel.

9. In a gear cutting machine, the combination with a blank spindle and an index wheel in fixed relation therewith, of a swinging index frame, a reciprocatory spring actuated bolt mounted on the frame for engagement with said index wheel, a pivoted actuator engaging said bolt and carrying a series of teeth, a rack bar coöperating with said teeth, a projection carried by the rack bar, a cam which intermittently engages said projection and moves the rack bar, means acting to move the swinging frame after it is unlocked from the index wheel, a latch which automatically engages said bolt and holds it withdrawn while the swinging frame is moving in one direction, and an abutment in the path of the latch acting to engage it and release the bolt after a predetermined movement of the swinging frame.

10. In a gear cutting machine, the combination with a blank spindle and an index wheel in fixed relation therewith, of a swinging index frame, a reciprocatory spring actuated bolt mounted on the frame for engagement with said index wheel, a pivoted actuator engaging said bolt and carrying a series of teeth, a rack bar coöperating with said teeth, a projection carried by the rack bar, a cam which intermittently engages said projection and moves the rack bar, a locking device engaging the swinging frame, and automatic means acting to move the locking device to release the frame and oscillate it intermittently.

11. In a gear cutting machine, the combination with a blank spindle and an index wheel in fixed relation therewith, of a swinging index frame, a reciprocatory spring actuated bolt mounted on the frame for engagement with said index wheel, a pivoted actuator engaging said bolt and carrying a series of teeth, a rack bar coöperating with said teeth, a projection carried by the rack bar, a cam which intermittently engages said projection and moves the rack bar, a locking device engaging the swinging frame, means acting to move the locking device to release the frame and oscillate it intermittently, a latch which automatically engages said bolt and holds it withdrawn while the swinging frame moves in one direction, and an abutment in the path of the latch acting to engage it and release the bolt after a predetermined movement of the swinging frame.

12. In a gear cutting machine, the combination with a blank spindle and an index wheel in fixed relation therewith, of a swinging index frame, a reciprocatory spring actuated bolt mounted on the frame for engagement with said index wheel, a pivoted actuator engaging said bolt and carrying a series of teeth, a rack bar coöperating with said teeth, a projection carried by the rack bar, an oscillatory carrier, a cam mounted on the carrier and arranged to engage said projection to move the rack bar, a lock also mounted on the carrier and normally holding the swinging frame against movement, and intermittently acting means which oscillates said carrier to release the lock which holds the swinging frame engaged with the index wheel and against movement.

13. In a gear cutting machine, the combination with a blank spindle and an index wheel in fixed relation therewith, of an index frame journaled to swing about the longitudinal axis of the blank spindle, a gear segment mounted on the index frame, a stationary bearing, an oscillatory spindle journaled therein, a pinion fixed on said spindle and engaging said gear segment, a gear member also fixed on said spindle, and an operating rack which intermittently oscillates and engages said gear member.

14. In a gear cutting machine, the combination with a blank spindle and an index wheel in fixed relation therewith, of an index frame journaled to swing about the longitudinal axis of the blank spindle, a spring controlled locking bolt slidably arranged on the index frame and engaging said index wheel, a pivoted actuator engaging said bolt having gear teeth thereon, a reciprocatory rack bar coöperating with said teeth, a projection carried by the rack bar, an oscillatory carrier, a cam secured to the carrier and acting when turned to engage said projection and move the rack bar, a gear member upon which the carrier is fixed, and an intermittently oscillatory rack which engages said gear member.

15. In a gear cutting machine, the combination with a blank spindle and an index wheel in fixed relation therewith, of an index frame journaled to swing about the longitudinal axis of the blank spindle, a spring controlled locking bolt slidably arranged on the index frame and engaging said index wheel, a pivoted actuator engaging said bolt having gear teeth thereon, a reciprocatory rack bar coöperating with said teeth, a projection carried by the rack bar, an oscillatory carrier, a cam secured to the carrier, and acting when turned to engage said projection and move the rack bar, a gear member upon which the carrier is fixed, an intermittently oscillatory rack which engages said gear member, and an abutment on the swinging frame which engages a locking recess in the aforesaid carrier, which when in normal position locks the index frame against movement.

16. In a gear cutting machine, the combination with a blank spindle and an index wheel in fixed relation therewith, of an index frame journaled to swing about the longitudinal axis of the blank spindle, a gear segment mounted on the index frame, a stationary bearing, an oscillatory spindle journaled therein, a pinion fixed on said spindle and engaging said gear segment, a gear member also fixed on said spindle, an operating rack which intermittently oscillates and engages said gear member, a spring controlled locking bolt slidably arranged on the index frame and engaging the index wheel, a pivoted actuator engaging said bolt having gear teeth thereon, a reciprocatory rack bar coöperating with said teeth, a projection carried by the rack bar, an oscillatory carrier, a cam secured to the carrier and acting when turned to engage said projection and move the rack bar, a gear member on which the carrier is fixed, and a second rack fixed to the aforesaid oscillatory rack and acting to turn said carrier in advance of the movement of said oscillatory spindle.

17. In a gear cutting machine, the combination with a blank spindle and an index wheel in fixed relation therewith, of an index frame journaled to swing about the longitudinal axis of the blank spindle, a gear segment mounted on the index frame, a stationary bearing, an oscillatory spindle journaled therein, a pinion fixed on said spindle and engaging said gear segment, a gear member also fixed on said spindle, an operating rack which intermittently oscillates and engages said gear member, a spring controlled locking bolt slidably arranged on the index frame and engaging the index wheel, a pivoted actuator engaging said bolt having gear teeth thereon, a reciprocatory rack bar coöperating with said teeth, a projection carried by the rack bar, an oscillatory carrier, a cam secured to the carrier and acting when turned to engage said projection and move the rack bar, a gear member on which the carrier is fixed, a second rack fixed to the aforesaid oscillatory rack and acting to turn said carrier in advance of the movement of said oscillatory spindle, a latch pivoted on the index frame and acting to engage and hold said bolt in retracted position, and a stationary pin which engages said latch after a predetermined movement of the swinging frame to release the latch into engagement with the index wheel.

18. In a gear cutting machine, the combination with a base, of a blank spindle support, indexing mechanism including a gear member, a curved guide carried by said base, a curved rack movable in said guide and engaging the gear member, and mechanism connected with said rack and operating intermittently to oscillate it.

19. In a gear cutting machine, the combination with a base, of a blank spindle support, indexing mechanism including a curved guide carried by the base, an index wheel fixed to the blank spindle, a swinging index frame, locking mechanism normally holding the index frame against movement and also locking it to the index wheel and including a gear member which is movable to release the index frame, a second gear member which is movable to actuate the index frame, curved racks movable in the aforementioned guide and engaging said gear members, one in advance of the other to first unlock the index frame and thereafter operate it, and connections with said racks acting intermittently to operate them.

EDWARD M. BULLOCK.
SCHUYLER H. EARL.
GEORGE H. BRYAN